UNITED STATES PATENT OFFICE.

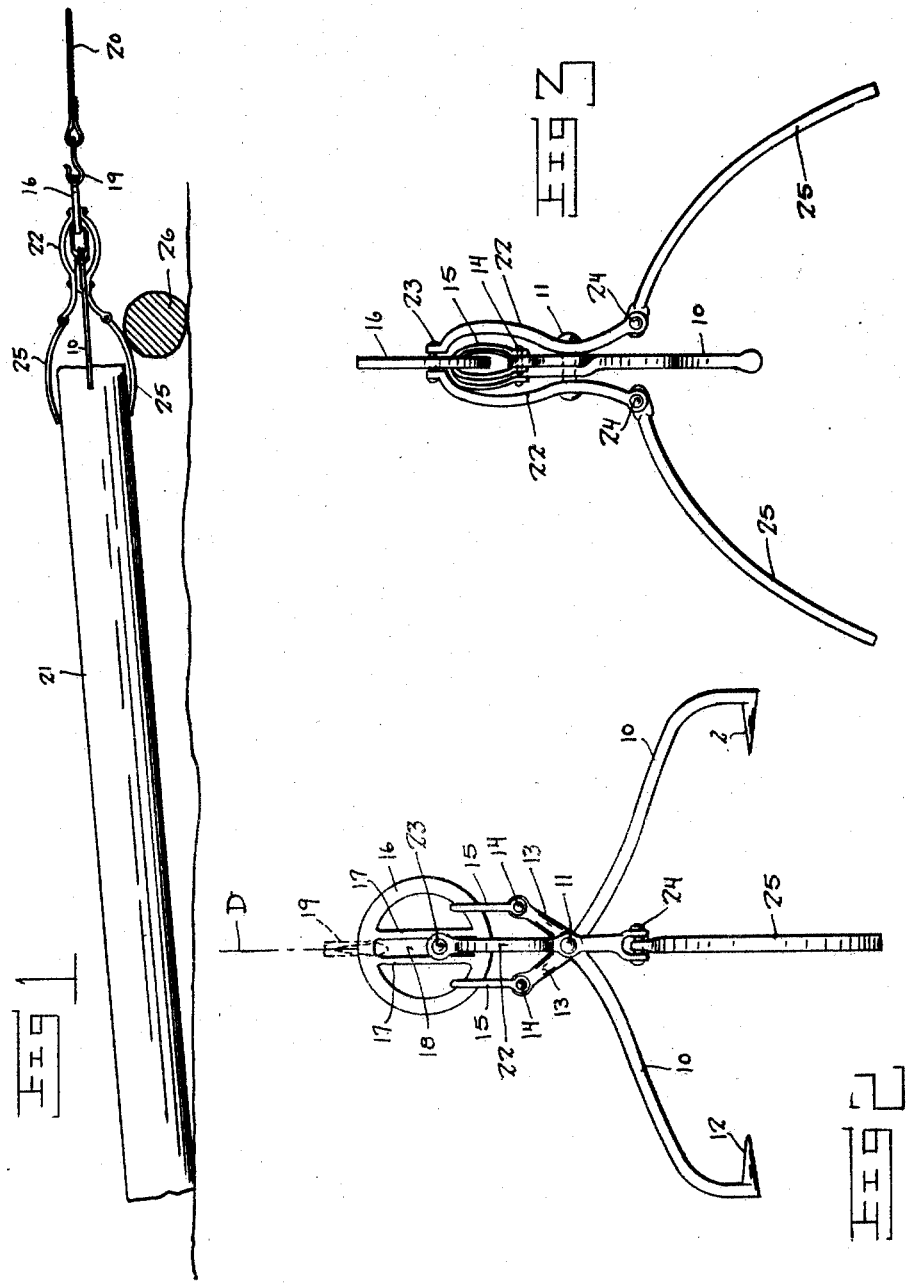

GEORGE H. CASEY, OF IONE, WASHINGTON.

TONGS.

1,366,244.  Specification of Letters Patent.  Patented Jan. 18, 1921.

Application filed April 12, 1920. Serial No. 373,380.

*To all whom it may concern:*

Be it known that I, GEORGE H. CASEY, a citizen of the United States, and a resident of Ione, in the county of Pend Oreille and State of Washington, have invented certain new and useful Improvements in Tongs, of which the following is a specification.

The present invention relates to improvements in tongs and especially to that class adapted to be used in towing logs or timber.

In towing or dragging newly felled timber through the woods from place of felling to loading point, it is normally necessary for several men to be detailed as "swampers" whose duty it is to cut a clear path for the advance of logs by removing brush and other obstructions and by cutting passage ways through wind-fall, etc. Progress over paths which are in any considerable degree obstructed by windfall, etc., is necessarily slow as such progress is limited by the speed with which the swampers are able to clear the path.

Therefore, it is the principal object of my invention to construct tongs which will dispense with the need for swampers to a great extent by the provision on said tongs of means for guiding towed logs over windfall or other obstructions which may lie in its path. By the use of my tongs, the towed logs will ride up and over any obstruction within reasonable limits, thereby eliminating the necessity of cutting a pathway or otherwise clearing away such obstruction.

A further object of the device is to so construct the tongs that logs may be readily towed over uneven ground where, with the usual type of tongs, the "nose" of the log would ordinarily bury itself in the ground and thereby hinder the advance of the log.

A further object is to provide a device of the class described wherein the means for guiding the logs over obstructions will be maintained in a certain relation with the direction of draft applied to the log.

A further object is to provide a device of the class described wherein the novel attachment for guiding the log nose will be self adjusting to logs of varying sizes within reasonable limits.

Further objects will be more fully described in the following specifications and more particularly pointed out in and by the appended claims.

In the drawings:

Figure 1 is a view showing my tongs adjusted to a log in the process of being towed over an obstruction.

Fig. 2 is a front elevation of my improved tongs.

Fig. 3 is a side elevation of the tongs.

Like numerals of reference refer to the same parts throughout the various figures of the drawings.

The jaw members of the tongs are indicated by the numeral 10, being pivoted one to the other by the pin 11 and being provided on their lower extremities with the log gripping points 12. Members 10 extend beyond the pin 11 as at 13 and the upper extremities thereof carry pins 14 on which are pivoted the yokes 15. Yokes 15 straddle the ring 16 as shown in Figs. 1 and 2. The bars 17 extend across the opening in ring 16 to form a slot or guideway 18. The towing hook 19, secured to the towing line 20, is adapted to be hooked to the ring 16 between bars 17 as shown in Fig. 2. The direction of draft imparted through the line 20 from the team or pulling power is indicated by the line D (Fig. 2) and it will be noted that line D is in line with the long dimension of guideway 18.

Pivoted on pin 11 are the opposed members 22 connected at their upper extremities by pin 23 which passes through and is guided by the guideway 18 as regards movement in the direction of the line of draft.

Pivoted to the lower extremities of members 22 at 24 are the opposed arms 25. The pivotal connection at 24 allows arms 25 to swing freely so as to allow adjustment to various sized logs.

The tongs are adjusted to the log, such as 21, to be towed, as shown in Fig. 1 so that one of the arms 25 bears against the bottom of the log and the ground. It will be seen that the opening or closing of jaws 10 does not affect members 22 or arms 25 since the ring 16 will simply slide up or down with respect to pin 23, guideway 18 allowing this movement. By reason of the construction and assembly of the device as shown and described above, it will be noted that arms 25 will always lie in a plane substantially perpendicular to the plane in which jaws 10 lie, and that the direction of draft, line D, will always be laterally in line with arms 25, thereby assuring that in towing a log such as 21, the tongs will always remain substantially in the position of Fig. 1, so as to render the device always effective in guiding the log nose over obstructions.

In towing logs over wind-fall, etc., such as 26, or over uneven ground, it will be seen that the arm 25 which bears against the ground will serve as a skid to guide the nose of the log over such wind-fall or uneven ground, as shown in Fig. 1, thereby eliminating the necessity of clearing or leveling the path of the log.

While I have herein shown and described one embodiment of my invention, I do not wish to be limited thereto except for such limitations as the claims may import.

I claim:—

1. In tongs for towing logs, log gripping jaws, means adapted to guide said logs over obstruction, said means comprising a ring, a guideway formed in said ring, said gripping jaws being operatively connected to said ring and pivotally arranged one with the other, opposed members pivoted to said jaws at the point of their pivotal connection, the upper ends of said members being connected by a pin passing through said guideway, and opposed arms pivoted to the lower ends of said members.

2. Towing tongs comprising a ring, gripping jaws pivotally arranged one with the other and operatively connected to said ring, opposed members pivoted to said jaws at the point of their pivotal connection, opposed arms pivoted to the lower ends of said members, and co-acting means on said ring and said opposed members adapted to retain said arms substantially in line with the lateral direction of draft applied to said ring.

3. Towing tongs comprising a ring, gripping jaws pivotally arranged one with the other and operatively connected to said ring, opposed members pivoted to said jaws at the point of their pivotal connection, opposed arms pivoted to the lower ends of said members, and co-acting means on said ring and said opposed members adapted to retain said arms substantially in line with the lateral direction of draft applied to said ring, said means comprising a guideway formed in said ring and extending in the direction of draft, and a pin extending through and slidable in said guideway, said pin connecting the upper ends of said members.

In testimony whereof, I hereby affix my signature.

GEORGE H. CASEY.